Oct. 16, 1956

C. C. CUNNINGHAM 2,766,632

WAVE MOTOR

Filed Sept. 1, 1953

Charles C. Cunningham
INVENTOR.

BY
Attorneys

Oct. 16, 1956     C. C. CUNNINGHAM     2,766,632
WAVE MOTOR
Filed Sept. 1, 1953     2 Sheets—Sheet 2
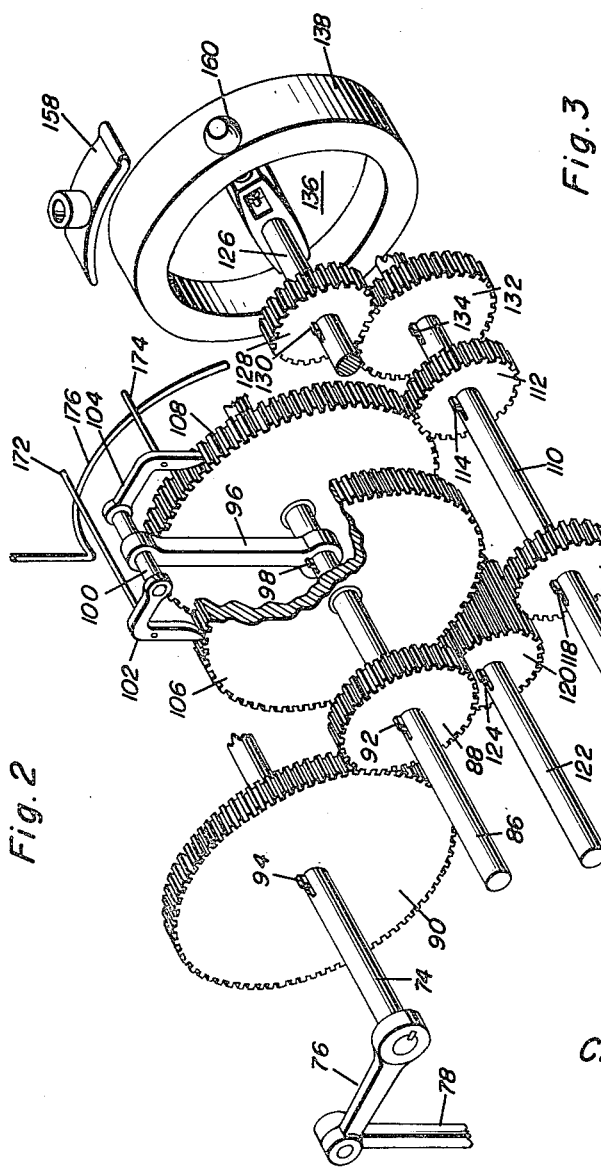
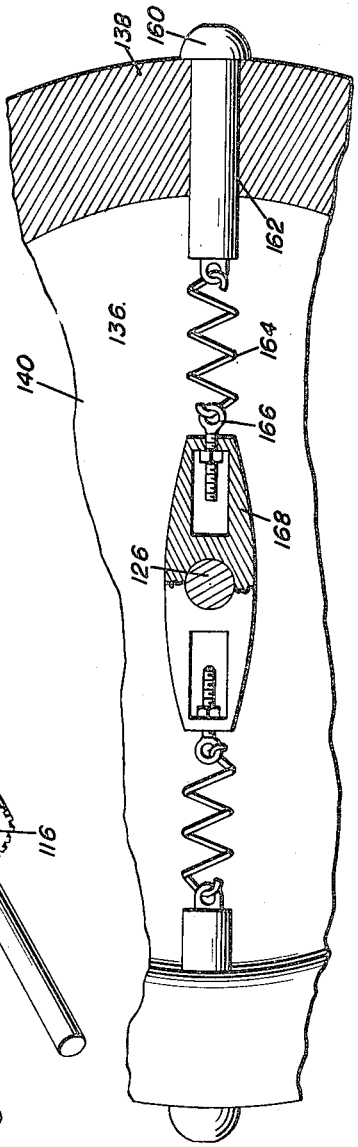
Charles C. Cunningham
INVENTOR.
BY *Clarence A. O'Brien*
*and Harvey B. Jacobson*
Attorneys United States Patent Office 2,766,632
Patented Oct. 16, 1956

2,766,632

WAVE MOTOR

Charles C. Cunningham, Hot Springs, Ark.

Application September 1, 1953, Serial No. 377,849

2 Claims. (Cl. 74—150)

This invention relates to a wave motor and particularly to a device for utilizing the power of restless water to drive the drive shaft which may supply power for any useful purpose.

In man's striving for power he has been able to tap the powers of most of the known sources but the restless water, that is, the power of waves, tides, currents and the like remain substantially unharnessed.

The present invention relates to a motive device to harness the power of restless water to produce a useful drive.

The construction according to the present invention comprises a float or other device responsive to the movement of restless waters and a multiplying lever to multiply this power and deliver it through a transmission system comprising a first cylinder having a piston driven by the multiplying lever and the second piston connected to the first piston by a fluid conduit and having a piston driven by the operation of the piston in the first cylinder. The reciprocating motion in the second cylinder is turned into rotary motion by means of a rectifier gear system and the output may be connected to any useful purpose. A flywheel governor will be provided for controlling the maximum speed of the device so that a run-away gearing system cannot result.

It is accordingly an object of the invention to provide an improved wave motor.

It is a further object of the invention to provide an improved transmission from a wave responsive device to a rectifying gear.

It is a further object of the invention to provide a rectifying gear for converting reciprocating motion into rotary motion.

It is a further object of the invention to provide an improved speed governor for a power shaft.

Other objects and many of the attendant advantages of the present invention will be apparent from the following detailed description taken in accordance with the accompanying drawings in which:

Figure 2 is a perspective view of the transmission gearing with the frame removed and parts broken away; and Figure 3 is a fragmentary view of the flywheel with the centrifugal governor element.

Figure 1:
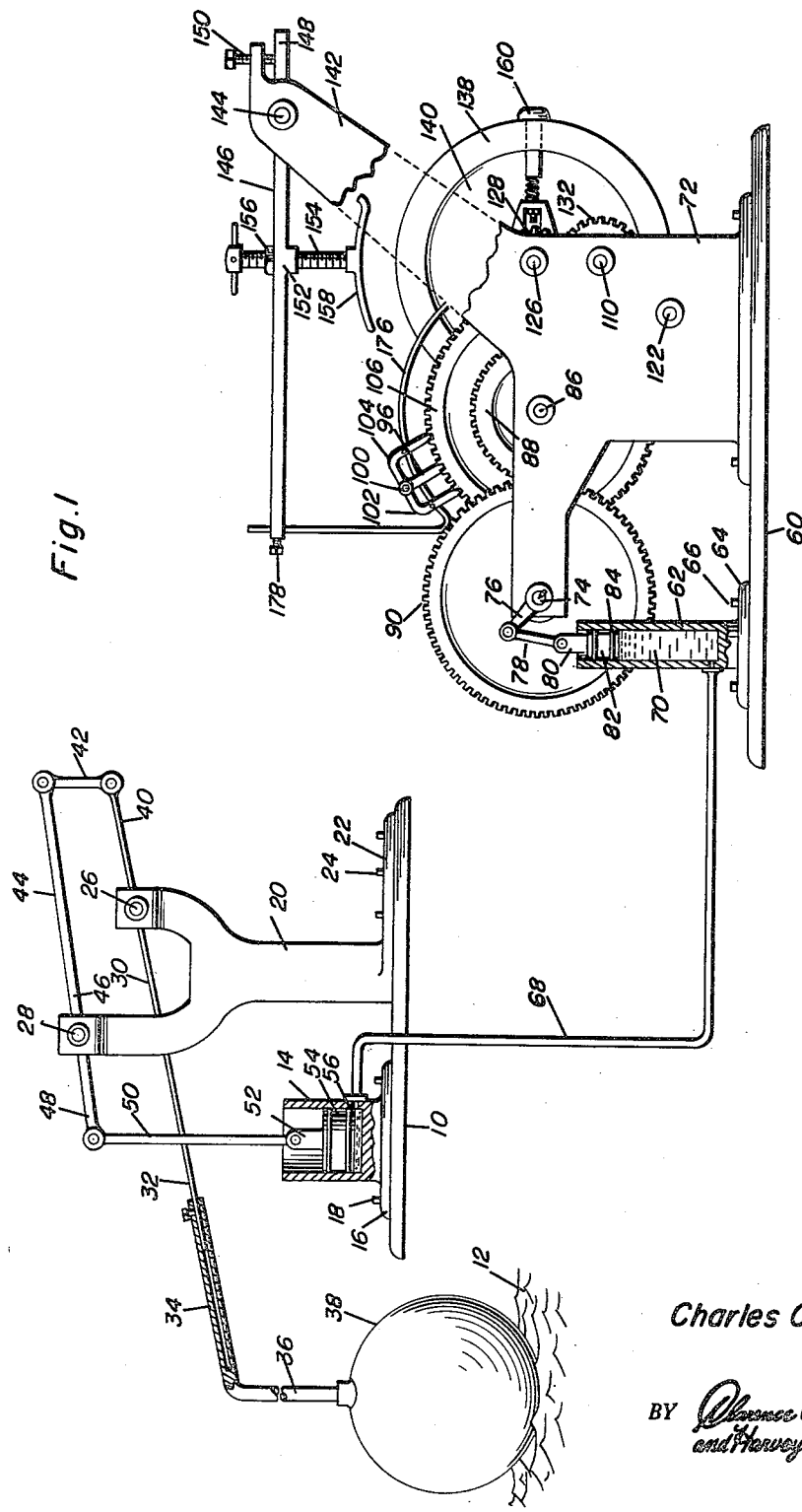
Figure 1 is an elevational view of the wave motor with parts broken away and parts in section.

In the exemplary embodiment according to the invention a first platform 10 is mounted in proximity to a source of restless water 12 and a first cylinder 14 is mounted thereon by any suitable means such as the flange 16 secured to the platform 10 by any suitable means such as the bolts 18. A fulcrum post 20 is also rigidly mounted on the platform 10 by any suitable means such as the flange 22 and the bolts 24. While the fulcrum post 20 may be of any desired shape and has any desired number of fulcrum points thereon for simplicity of operation, the post 20 is shown as being of Y-formation having a first fulcrum post 26 and a second fulcrum point 28. The first lever 30 has a long arm 32 on which may be mounted an adjustable extension 34 which is connected by means of a suitable upright 36 to a float 38 or other means responsive to movement of the restless water. The short end 40 of the lever 30 is connected by means of a link 42 to a long end 44 of a second lever 46 which is fulcrumed on the point 28 which has a short end 48 connected by means of a pitman 50 to a piston rod 52 of a piston 54 which is slidably mounted in the cylinder 14. The cylinder 14 is provided with suitable sealing rings 56.

A second platform 60 is mounted in any suitable position preferably at a material distance from the restless water 12 so that there will be little danger of damage to the equipment by the restless water.

A second fluid cylinder 62 is mounted on the platform 60 by any suitable means such as the flange 64 and the bolt 66. The cylinder 14 is connected to the cylinder 62 by a suitable fluid conduit 68. The pressure transmitting fluid 70 is placed in the cylinders 14 and 62 and is sufficient in quantity to fill at least one of the cylinders 14 or 62 and the conduit 64 extending therebetween.

A frame 72 is mounted on the platform 60 in fixed spaced relation to the cylinder 62. A rock shaft 74 is journaled in the frame 72 in proximity to the cylinder 62 and an arm 76 is rigidly secured in radially extending relation to the rock shaft 74. The crank arm 76 is connected by means of a pitman 78 to a piston rod 80 of a piston 82 slidable in the cylinder 62. The piston 82 is provided with suitable sealing rings 84 and this piston 82 is responsive to movement of the piston 54 so that reciprocation of the piston 54 reciprocates the piston 82.

An oscillatory shaft 86 is also freely journaled in the frame 72 and has a pinion 88 in mesh with a gear 90 on the rock shaft 74. The pinion 88 is rigidly fixed with respect to the shaft 86 by any suitable means such as the key 92 and the gear 90 is similarly fixed to the rock shaft 74 by a key 94.

The dog shaft 86 has a dog arm 96 rigidly mounted thereon and extending radially therefrom and secured against rotation by a suitable device such as the key 98. A T-arm 100 is mounted on the top end of the dog arm 96 and a pair of dogs 102 and 104 are journaled on the opposite ends of the dog shaft 100. Oppositely running gears 106 and 108 are journaled on the dog shaft 86 and the dogs 102 and 104 are respectively engageable with the teeth on the gears 106 and 108 in opposite directions. A drive shaft 110 is freely journaled in the frame 72 and has a first pinion gear 112 fixed on the gear shaft 110 by means of a key 114 and the pinion 112 is in mesh with the gear 108 which is rotatable on the dog shaft 86. A second pinion 116 is likewise fixed on the drive shaft 110 by means of a suitable key 118 and the pinion 116 is in mesh with an idler gear 120 which is mounted on an idler shaft 122 which is journaled in the frame 72. If desired the idler gear 120 may be fixed on the shaft 122 by means of a key 124 although such connection is not necessary. The idler gear 120 is in mesh with the gear 106 so that the gears 106 and 108 constantly rotate in opposite directions while the drive shaft 110 operates in a single direction or unidirectional direction.

A flywheel shaft 126 is also journaled in the frame 72 and is provided with a pinion 128 secured in fixed relation by means of a key 130. The pinion 128 is in mesh with a gear 132 secured on the gear shaft 110 by means of a key 134.

The flywheel 136 is of substantially cup-like formation having a hub 138 mounted on a disk 140 which is keyed onto the flywheel shaft 126.

The frame 72 is provided with an upwardly and outwardly extending bracket arm 142 in which is provided a pivot pin 144 on which is journaled a control lever 146.

An end 148 of the control lever 146 extends outwardly beyond the pivot pin 144 and contacts a stop screw 150 which will control the pivotal motion of the arm 146 about the pivot pin 144. A boss 152 is provided on the control lever 146 and the adjusting screw 154 is threadedly engageable therewith and locked in position by means of the lock nut 156. A control shoe 158 is mounted on the lower end of the adjusting screw 154 and fly balls or centrifugally controlled weights 160 are mounted in apertures 162 in the rim 138 and resiliently held in withdrawn position by means of springs 164 which are adjustably connected by means of eye bolts 166 mounted in the eye bolt receiving frame 168 so that the tension of the spring 164 may be controlled. The dog 102 is provided with a lifting pin 172 while the dog 104 is provided with a lifting pin 174 and an arcuate lifting finger 176 is adjustably connected to the end of the arm 146 by means of a set screw 178.

In the operation of the device the water engaging device 38 will move about because of its contact with the restless water so that the multiplying levers will cause a reciprocating motion of the piston 54 and the cylinder 14 so that the transmission fluid will be constantly moving backwards and forward between the first and second cylinders.

The surging of the fluid 70 backwards and forward between the cylinder 14 and the cylinder 62 causes the reciprocation of the piston 82 so that the pitman 78 causes oscillatory motion of the crank 76 so that the gear 90 is caused to have a backwards and forward or oscillatory motion. Rocking motion of the gear 90 causes the pinion 88 to be rocked through a still greater angle so that the dog arm 94 is rocked to and fro according to the motion of the piston 82. Dogs 102 or 104 will one or the other possibly engage the gears 106 or 108 depending on the direction of motion of the arm 96 so that the gears 108 and 106 will alternately be propelled by the rocking of the dog shaft 86. One or the other of the gears 106 and 108 will drive the pinion 112 or 116 depending on which of the gears is being driven so that the drive shaft 110 will constantly revolve in a unidirectional motion. Any suitable load may, of course, be connected to the drive shaft 110 so that use may be made of the power controlled by the wave motor.

In order to prevent excessive speed of the device the governor device including the flywheel 136 is operatively connected to the drive shaft 110 and when the speed of the flywheel exceeds a predetermined amount the weights 160 will be projected outwardly to strike the shoe 158 to cause the lever 146 which raises the finger 176 to engage the pins 172 and 174 and momentarily disengage the dogs 102 and 104 from the gear wheels 106 or 108.

It will thus be apparent that the present invention provides a wave motor which utilizes the motion of restless water to provide a continuously operable rotation of movement which can be utilized to drive any suitable device.

For simplicity of explanation, a preferred embodiment of the invention has been shown and described according to the best present understanding thereof. However, it will be apparent to those skilled in the art that any changes and modifications may be made in the construction and arrangements of the parts thereof without departing from the spirit and scope of the invention.

What is claimed as new is as follows:

1. A converter gearing for converting reciprocating motion to unidirectional rotary motion comprising a frame, a rock shaft journaled in said frame, a crank fixed on the rock shaft, a dog shaft journaled in said frame, a gear fixed on said rock shaft, a pitman connecting said crank to a source of reciprocating motion, a pinion fixed on said dog shaft, said pinion being in mesh with the gear on the rock shaft, a dog arm fixed on said dog shaft, a pair of oppositely directed dogs pivoted on said dog arm, a pair of gears journaled on said dog shaft, said dogs engaging said gears to drive said gears in opposite directions, a drive shaft, a fixed pinion fixed on said drive shaft, said first pinion being in mesh with one of said pair of gears, a second pinion on said drive shaft, an idler gear connecting said second pinion to the other of said pair of gears, a flywheel shaft, a flywheel on said flywheel shaft, a gear on said drive shaft, a pinion on said flywheel shaft, said pinion on said flywheel shaft being in mesh with said gear on said drive shaft, a lever pivoted on said frame, a shoe on said lever, said shoe overlying said flywheel, centrifugally actuated trip members mounted in said flywheel, lifting pins on said dogs, an arcuate lifting finger on said lever, said trip members engaging said shoe at a predetermined speed of said flywheel to actuate said lever and disengage said dogs from said pair of gears.

2. A converter gearing comprising a frame, a rock shaft journaled in said frame and adapted to be power driven, a dog shaft journaled in said frame, a pair of gears journaled on said dog shaft, a dog arm fixed on said dog shaft, a pair of oppositely directed dogs pivoted on said dog arm, said dogs engaging said gears to drive said gears in opposite directions relatively, gearing between said rock shaft and said dog shaft, a drive shaft, a flywheel shaft journaled in said frame and having a flywheel fast thereon, gearing between one gear of the pair of gears and said drive shaft for driving the drive shaft in the same direction as said one gear, gearing between the other gear of the pair of gears and the drive shaft for driving the drive shaft oppositely relative to said other gear, gearing between said drive shaft and said flywheel shaft, a lever pivoted on said frame, a shoe on said lever overlying the flywheel, centrifugally operated trip members mounted on said flywheel, lifting pins on said dogs, an arcuate lifting finger on said lever, said trip members engaging said shoe at a predetermined speed of said flywheel to actuate said lever and disengage said dogs from said pair of gears.

References Cited in the file of this patent

UNITED STATES PATENTS

| Number | Name | Date |
|---|---|---|
| 335,460 | Koelkebeck | Feb. 2, 1886 |
| 403,929 | Ewart | May 28, 1889 |
| 758,578 | Yokoum | Apr. 26, 1904 |
| 840,581 | Nelson | Jan. 8, 1907 |
| 892,567 | Thrasher | July 7, 1908 |
| 971,343 | Barr | Sept. 27, 1910 |
| 1,109,530 | Johnson | Sept. 1, 1914 |
| 1,548,666 | Dickinson | Aug. 4, 1925 |
| 2,036,073 | O'Hagan | Mar. 31, 1936 |
| 2,244,350 | Sugden | June 3, 1941 |